Nov. 27, 1956 O. B. DUTTON 2,772,398

SIMPLIFIED CIRCUITS FOR PRODUCING AMPLITUDE MODULATION

Filed Sept. 17, 1953 3 Sheets-Sheet 1

OSCAR B. DUTTON
*INVENTOR.*

BY Bruce L Birchard
HIS ATTORNEY

OSCAR B. DUTTON
INVENTOR.
BY [signature]
HIS ATTORNEY

OSCAR B. DUTTON
*INVENTOR.*

BY [signature]
HIS ATTORNEY

United States Patent Office 2,772,398

Patented Nov. 27, 1956

2,772,398

SIMPLIFIED CIRCUITS FOR PRODUCING AMPLITUDE MODULATION

Oscar B. Dutton, Redondo Beach, Calif., assignor to Hoffman Electronics Corporation, a corporation of California Application September 17, 1953, Serial No. 380,770

7 Claims. (Cl. 332—41)

Figures 1, 1A:
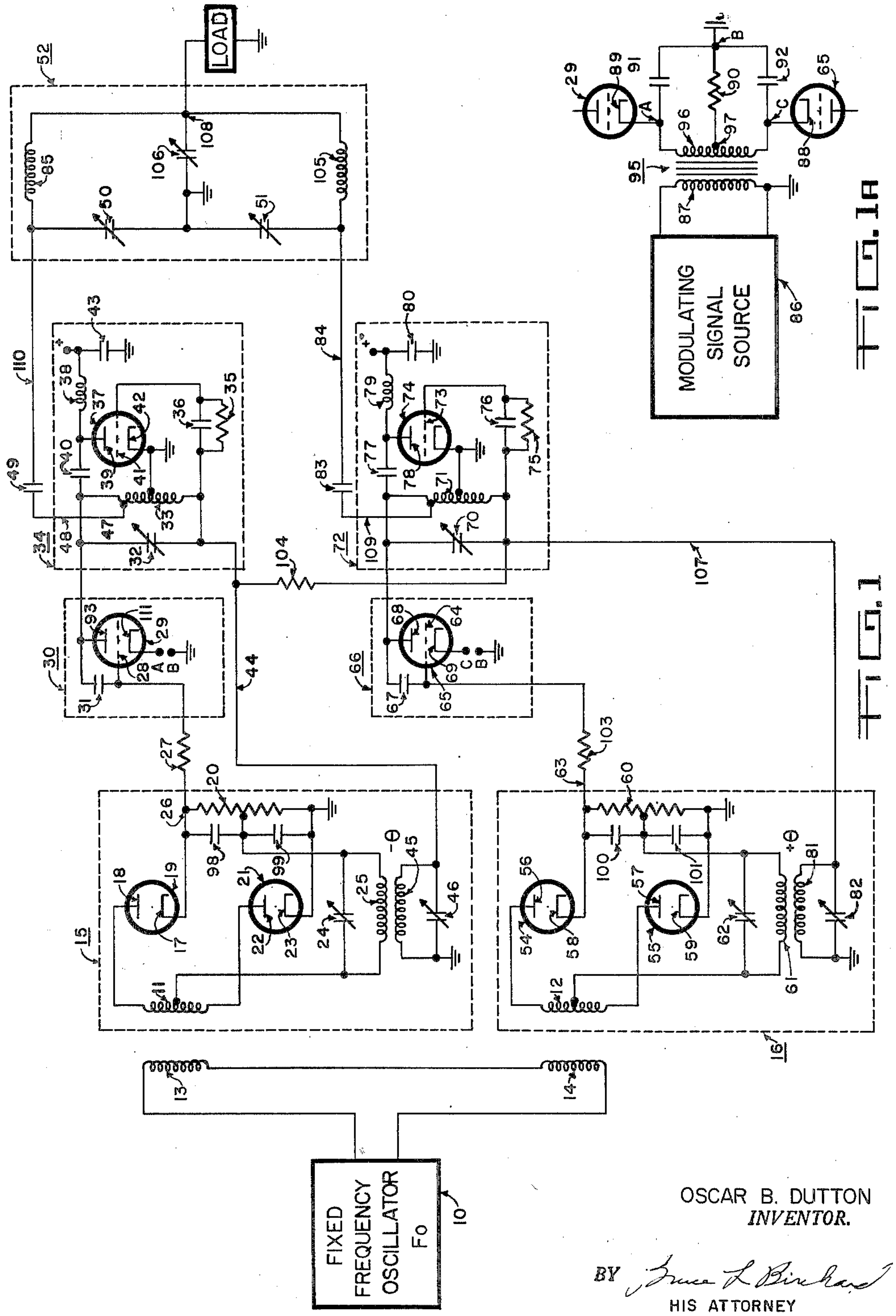

This invention relates to apparatus for transmitting information and more particularly to an improved circuit for the amplitude modulation of carrier waves.

In the past many methods have been attempted for modulating high-powered radio frequency carrier waves with low-powered audio or video intelligence signals. Invariably certain problems are encountered which have made such systems unsatisfactory. For example, if an attempt is made to modulate directly a crystal oscillator and then to follow that oscillator with several stages of radio frequency amplification, a very undesirable effect arises from the phase modulation which accompanies the attempted amplitude modulation of the oscillator. This undesirable phase modulation results in distortion of the modulating wave so that the intelligence cannot be reproduced with fidelity at the receiver. On the other hand, there is always the desire to minimize the cost of transmitting equipment and attention is frequently directed to the modulator section which is, in the normal transmitter, a very important and expensive part of the overall transmitter.

It is an object, therefore, of this invention to provide an improved circuit for transmitting intelligence by modulation of a carrier wave.

It is a further object of this invention to provide a circuit by which intelligence is modulated on a carrier wave with a minimum of equipment and with a maximum of fidelity.

It is a further object of this invention to provide a transmitter in which modulation of the carrier wave is effected in the low-level stages of the transmitter without a loss of fidelity in the information ultimately emitted by the transmitter.

It is a still further object to provide a simplified suppressed carrier, amplitude modulated transmitter.

According to this invention two automatic frequency control circuits including the oscillators controlled thereby are adjusted so that the two oscillators are maintained in a predetermined phase relationship with respect to each other in the absence of modulating voltages. The modulating voltages are applied out of phase to the two reactance tubes, one in each of the automatic frequency control circuits, and overpower, to some degree, the error voltages developed in the phase discriminators associated with the control circuits. By this means the vectors representing the voltages developed in the two oscillators are caused to rotate in opposite directions with respect to each other resulting in amplitude modulation of the carrier voltage appearing across a combining circuit. There is no frequency or phase modulation of the combined signal.

The features of the present invention which are believed to be novel are set forth with particularity in the appended claims. The present invention itself, both as to its organization and manner of operation, together with further objects and advantages thereof, may best be understood by reference to the following description, taken in connection with the accompanying drawings, in which:

Figure 1 is a schematic diagram of a transmitter embodying this invention.

Figure 2:
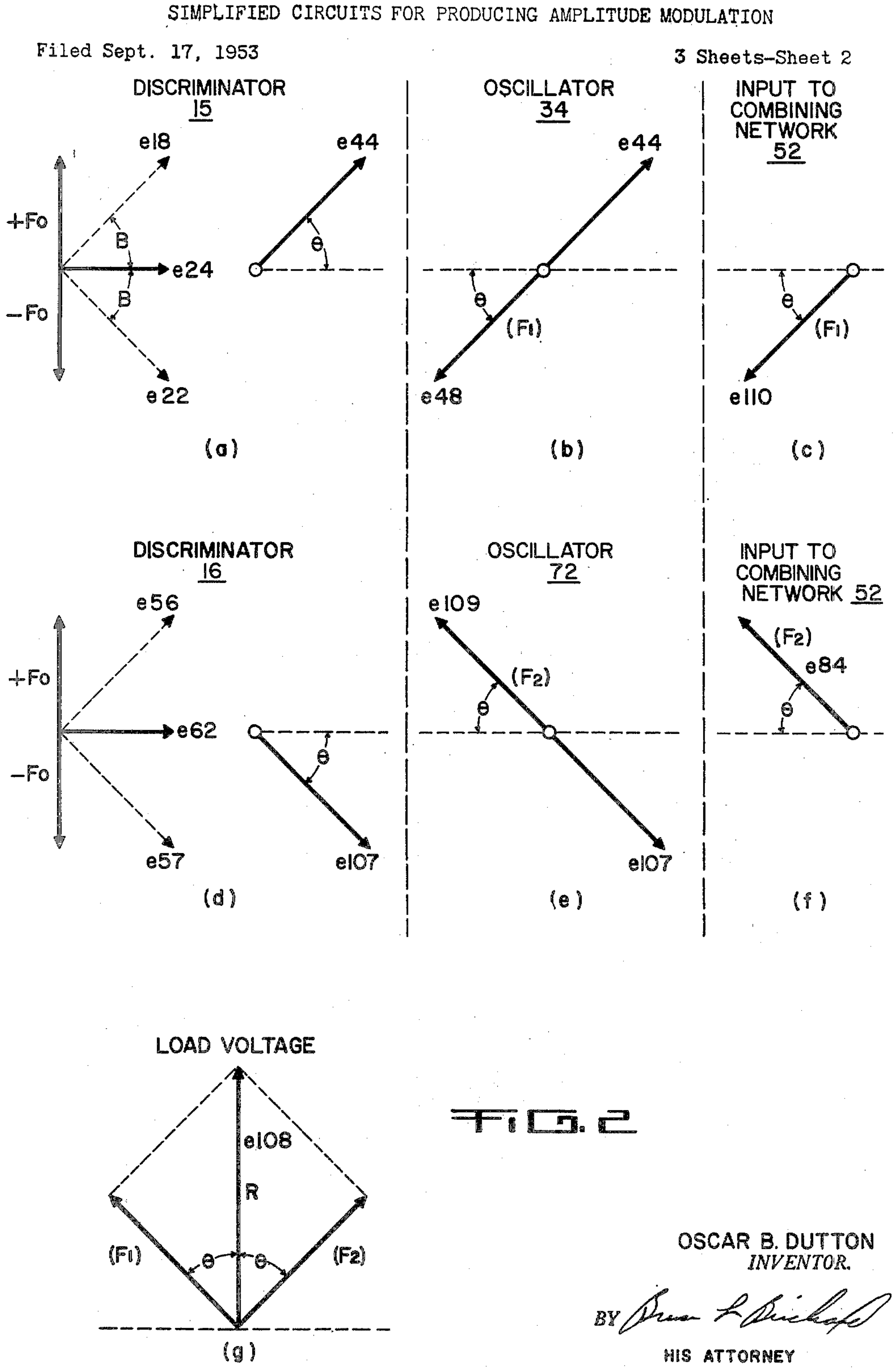
Figure 3:
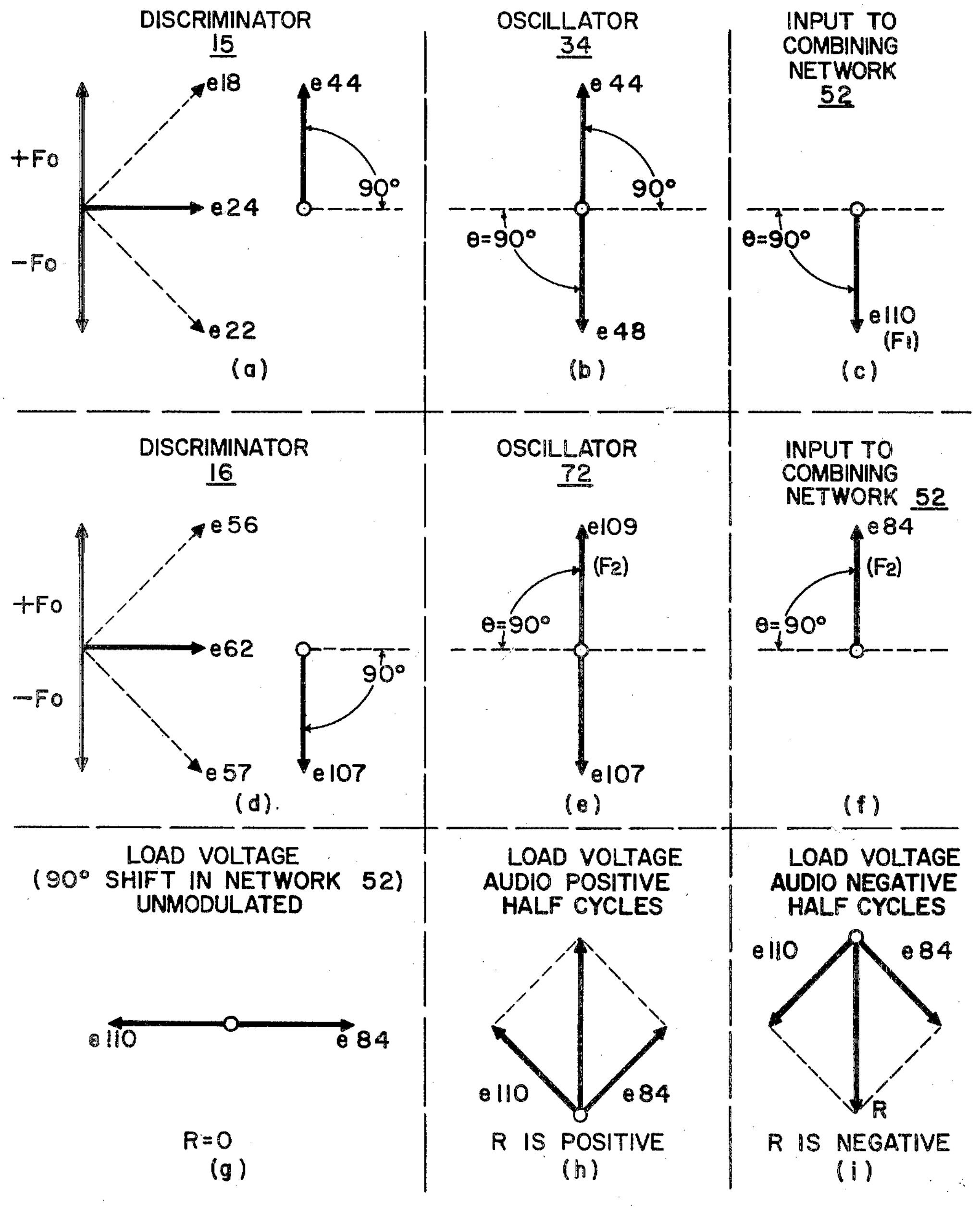

Figure 1–A is explanatory of a portion of the circuit of Figure 1; and,

Figure 2 is a representation of the vectorial relationship between various potentials existing in the circuit of Figure 1, under one set of operating conditions; and, Figure 3 is a vectorial representation of the relationship between various circuit potentials under a second set of operating conditions.

In Figure 1, a signal at the desired carrier frequency is generated in oscillator 10, which may be crystal controlled. This signal at carrier frequency is coupled to secondaries 11 and 12 from primaries 13 and 14, respectively. Secondary 11 is a portion of phase discriminator circuit 15 and secondary 12 is a portion of phase discriminator 16. Phase discriminator circuit 15 includes, in addition, diode 19 which has its plate 18 connected to one end of secondary 11 and its cathode 17 connected to one end of resistor 20 which is also, in part, a load for diode 21. Diode 21 has its plate connected to the opposite end of secondary 11 from that to which plate 18 of diode 19 is connected. The cathode 23 of diode 21 is connected to the opposite end of resistor 20 from that to which cathode 19 is connected. The junction of the connection from cathode 23 and the one end of resistor 20 is grounded. A shunt connected combination of condenser 24 and inductance 25 is connected between a center tap on resistor 20 and a center tap on secondary 11 to complete the phase discriminator circuit. Condensers 98 and 99 by-pass radio frequency currents to ground.

Control potential from the phase discriminator circuit 15 is taken from terminal 26 and conducted through resistor 27 to grid 28 of reactance tube 29 in the reactance modulator 30. A capacitance 31 is connected between grid 28 and plate 32 of the reactance tube 29. The cathode 111 of reactance tube 29 is connected to terminal A, the connections to which are more clearly shown in Figure 1A.

Reactance modulator 30 is shunted across the tank circuit comprising condenser 32 and inductance 33 of oscillator 34. The exact setting of this tank circuit will be described more fully hereinafter, but broadly it is adjusted to resonate at approximately the desired carrier frequency as represented by the crystal controlled or otherwise frequency controlled oscillator 10. Oscillator 34 is shown in Figure 1 as being a shunt-fed Hartley oscillator but, obviously, may be any other reasonable oscillator circuit and still lie within the scope of this invention. The combination of resistor 35 and capacitor 36 provides bias for the oscillator tube 37. That tube is supplied operating plate voltage through radio-frequency choke 38 from a source of positive voltage not shown. In addition to being connected to the remote end of radio frequency choke 38, plate 39 is connected through blocking condenser 40 to one end of inductance 33. The other end of that inductance being connected to one common junction of resistor 35 and condenser 36, the opposite common junction thereof being connected to grid 41 of oscillator tube 37. The cathode 42 of oscillator tube 37 is grounded as is a central point on inductance 33. The condenser 43 serves to by-pass radio frequency currents to ground so that they are prevented from circulating in the source of positive voltage. A portion of the output voltage from oscillator circuit 34 is coupled through connector 44 to a tuned circuit comprising the shunt connected inductance 45 and the capacitance 46 which are in an inductively coupled relationship with the tuned circuit comprising inductance 25 and capacitance 24 of the phase discriminator 15. This circuit provides a feedback of the signal to be controlled to the phase discriminator so that an error voltage may be generated as will be described hereinafter. Output power is derived by means of a connection 47 on inductance 33. Conductor 48 which is connected to that point has interposed therein capacitance 49. The remote end of conductor 48 is connected to the common connection of inductor 85 and condenser 50 in phase shifting and combining network 52, the operation of which will be explained hereinafter.

Phase discriminator 16 is substantially identical with phase discriminator 15 and comprises a pair of diodes 54 and 55 having their plates 56 and 57 connected at opposite ends, respectively, of inductance 12. The cathodes 58 and 59 of these diodes are connected across resistor 60 which constitutes a direct current load. The midpoints of inductance 12 and resistor 60 are interconnected through a tuned circuit comprising inductance 61 and capacitance 62. Radio frequency currents appearing on conductor 63 are by-passed to ground through condensers 100 and 101. Control voltage is taken from phase discriminator 16 by means of conductor 63 which is connected through resistor 103 to grid 64 of reactance tube 65 in reactance modulator 66. Capacitance 67 is connected between plate 68 and grid 64 of reactance tube 65. Cathode 69 of that tube is connected to terminal "C" shown in Figure 1A.

Reactance modulator 66 is shunted across the tank circuit comprising capacitance 70 and inductance 71 of oscillator 72 which, like oscillator 34, is connected as a shunt-fed Hartley type of oscillator. Grid 73 of oscillaor tube 74 is connected through the shunt connected grid resistor 75 and capacitance 76 to one end of inductance 71. The other end of that inductance 71 is connected through blocking condenser 77 to plate 78 of oscillator tube 74. Operating potential for plate 78 is provided from a source of positive voltage, not shown, through radio frequency choke 79. Capacitance 80 serves to by-pass radio-frequency currents to ground so that they do not appear in the source of positive voltage. A sample of the output voltage from oscillator 72 is coupled into the phase discriminator 16 through the shunt connected combination of inductance 81 and capacitance 82 which are in inductive relationship to inductance 61 of the phase discriminator 16. Output power from oscillator 72 is coupled through capacitance 83 and conductor 84 to the common connection of inductor 105 and condenser 51 in network 52.

Amplitude modulated radio frequency power may be taken from the common connection of inductors 105 and 85 and condenser 106. Resistor 104 is provided to improve the regulation of grid voltages appearing at grids 41 and 73, respectively.

Figure 1–A shows in very brief fashion the means for introducing modulation voltage into the system so that the desired transmission of intelligence may be effected. A source of audio or other intelligence 86 is connected to primary 87 of coupling transformer 95, the secondary 96 of which has one extremity connected to cathode 89 of reactance tube 29 and has its other extremity connected to cathode 69 of reactance tube 65. Bias for the operation of the two reactance tubes is provided by means of resistance 90 connected between the center tap 97 of secondary 89 and ground potential. Capacitances 91 and 92 aid in maintaining this bias potenial at the desired value.

The circuits of Figure 1 and Figure 1–A operate as follows: Fixed frequency oscillator 10 is set to operate at the desired carrier frequency of the transmitter. A portion of its output voltage is coupled to two phase discriminators 15 and 16. This voltage, in each discriminator, acts as the reference frequency to which oscillators 34 and 66 are locked. The combination of capacitance 32 and inductance 33 of oscillator 34 is adjusted so that the phase of the output voltage from oscillator 34 at conductor 44 lags the phase of the reference voltage appearing in inductance 11 by an angle $(90-\theta)$ degrees in the absence of any modulation voltage. Correspondingly, the values of capacitance 70 and inductance 71 in oscillator 72 are adjusted so that the phase of the output voltage from oscillator 72 at conductor 107 lags the reference voltage appearing in inductance 12 by $(90+\theta)$ degrees in the absence of modulation voltage. In order to establish within the phase discriminators a condition of no error voltage in the absence of modulation, a compensating phase shift must be introduced in the feedback path from each oscillator to its associated phase discriminator. For example, the output of oscillator 34 is coupled through conductor 44 and shunt-connected elements 45 and 46 to the phase discriminator 15. The values of capacitance 46 and inductance 45 and the values of capacitance 24 and inductance 25 are so adjusted that at the desired carrier frequency a phase of $\theta°$ is introduced between the oscillator 34 and the phase discriminator 15. Similarly, a phase advance of $\theta°$ is introduced between oscillator 72 and phase discriminator 16.

These phase relationships are set forth vectorial diagrams in Figure 2: (*a*) through (*g*). In detail, oscillator 34 is adjusted so that the phase of its oscillation voltage (*e*44) lags that of $F_o$ the reference frequency, by $(90g-\theta)$ degrees, an additional lag of $\theta$ degrees is introduced by the tuned network comprising capacitance 46 inductance 45, capacitance 24 and inductance 25 and the voltage which appears across capacitance 24 has a 90° phase lag with respect to $F_o$ as shown in Figure 2 (*a*). The resultant voltages applied to diodes 19 and 21 are, in the unmodulated state, at plus and minus B degrees with respect to each other and of equal magnitude, as represented by vectors *e*18 and *e*22 in Figure 2A. The resultant error voltage appearing across resistor 20 is thus reduced to zero in the absence of modulation.

The voltage fed from oscillator 34 to combining network 52 is 180° out of phase with the voltage fed to phase discriminator 15 from oscillator 34, as shown in Figure 2(*b*). The voltage applied to the junction of inductance 85 and condenser 50 in combining network 52 is shown in Figure 2(*c*).

Oscillator 72 in the unmodulated state is adjusted to oscillate with a phase lagging the phase of the reference oscillator by an angle $(90+\theta)$ degrees. In feeding a portion of the output voltage from oscillator 72 into phase discriminator 16 a phase advance of $\theta$ degrees is introduced in the coupling network comprising capacitance 82, inductor 81, inductor 61 and capacitor 62 with the result that the voltage appearing across capacitor 62 lags the phase of the reference voltage by 90 degrees. The vectorial voltages applied to anodes 56 and 57 of diodes 54 and 55 in phase discriminator 16 have the relationship shown in Figure 2(*d*), where it may be seen that these two vectors are at 90° with respect to each other but of equal magnitude so that the resultant correction voltage appearing across resistance 60 is reduced to zero in the unmodulated state. In Figure 2(*e*) the 180° phase relationship between the voltage fed from oscillator 72 to discriminator 16 and that fed from oscillator 72 to combining network 52 is set forth. The voltage appearing at the junction of condenser 51 and inductor 105 in combining network 52 is shown vectorially in Figure 2(*f*). Combining network 52 has a 90° phase shift characteristic with the result that the vectors representing the voltages *e*84 and *e*110 are shifted 90° before those voltages are combined at junction 108 of network 52. The vector relationships at that point are shown at Figure 2(g). It will be noted that the two component vectors are equal in magnitude and at equal angles on opposite sides of the resultant R in the unmodulated state.

As will be noted from Figure 1–A, the modulating voltages are applied to reactance tubes 29 and 65 in a 180° phase relationship. Consequently, as the phase of the output voltage from one oscillator leads with modulation the output voltage lags with modulation in the other oscillator. Referring to Figure 2(*g*), vectors F1 and F2 swing in opposite directions when modulation occurs. They are permitted to swing between two extreme conditions corresponding to a zero degree phase difference and a 180° phase difference between the vectors. The swing of these vectors occurs in equal amounts in these opposite directions so that the resultant vector R changes only in length and not in position. Consequently, only amplitude modulation occurs and phase and frequency modulation are totally absent.

The phase modulation effected in each of the oscillators 34 and 66 is of a limited magnitude, the maximum being ±90°. Within that range oscillators 34 and 66 will remain fixed at the frequency of oscillator 10 although their phases will vary. The gain of each frequency control loop of this system is adjusted to permit a phase difference to exist up to the aforementioned amount. As a result of so adjusting the gain, phase discriminators 15 and 16 will not be successful in overcoming the phase modulation of oscillators 34 and 66, respectively, produced by modulating signals from source 86 when applied to reactance tubes 29 and 65, respectively.

The amplitude modulated voltage appearing at the junction point 108 may be coupled directly to an antenna system or to successive amplifier stages which may raise the radio frequency power level to any desired degree before radiating it.

The 90° phase shift characteristic of combining network 52 is required to prevent effectively short circuiting oscillators 34 and 72 when the output voltages therefrom are in phase opposition. As a result of this phase shift the effective short circuit at the combining point is transformed to substantially open circuit at the oscillator plates, and the undesirable short circuiting effect is eliminated.

As the phases shift with modulation, the drive voltages appearing at grids 41 and 73 vary between rather wide limits in the absence of regulating resistor 104 which interconnects the biasing circuits of oscillators 34 and 72.

If the angle $\theta$ in the foregoing discussion is given the value $\theta=90°$, a special case exists wherein the foregoing circuit acts as a balanced modulator providing an output signal containing only the amplitude modulation sidebands with the carrier suppressed. The vector relationships in the circuit under those conditions is shown in Figure 3, *a–i*.

Under a no-modulation (carrier) condition the vectors representing the voltages from the two oscillators 34 and 72 are equal in size and opposite in direction, as shown in Figure 3(*g*), hence cancelling. With modulation, the resultant (R) swings as shown in Figure 3 (*h* and *i*), and the side-bands are produced.

From the foregoing discussion it may be seen that there has been provided a simplified transmitter circuit which permits modulation of relatively large radio frequency power by means of low modulating power without deriving any undesirable phase or frequency modulation, thereby maintaining the fidelity of the original intelligence which it is desired be transmitted. In addition, in the special case, suppressed carrier amplitude modulation is produced with simplicity.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A circuit for producing a carrier wave amplitude modulated with an intelligence signal, including: a source of reference voltage having a frequency corresponding to that desired for said carrier wave; a first oscillator adjusted to have an output voltage at the frequency of said reference voltage but having a first predetermined unmodulated phase lagging the phase of said reference voltage by ($n90-\theta$) degrees, where $n$ is odd; first automatic means connected to said first oscillator and including a first comparison circuit for developing a first error voltage when the phase of the output voltage from said first oscillator deviates from its predetermined relationship with respect to that of said reference voltage; first output means for selecting a portion of the output power from said first oscillator; a second oscillator adjusted to have an output voltage at the frequency of said reference voltage but having a second predetermined unmodulated phase lagging the phase of said reference voltage by ($n90+\theta$) degrees, where $n$ is odd; second automatic means connected to said second oscillator and including a second comparison circuit for developing a second error voltage when the phase of the output voltage from said second oscillator deviates from its predetermined relationship with respect to that of said reference voltage; second output means for selecting a portion of the output power from said second oscillator; means for superimposing an intelligence signal voltage on said first error voltage in a first phase and on said second error voltage in an opposite phase; and a combining network connected to said first and second output means.

2. A circuit for producing a carrier wave amplitude modulated with an intelligence signal, including: a source of reference voltage having a frequency corresponding to that desired for said carrier wave; a first oscillator adjusted to have an output voltage at the frequency of said reference voltage but having a first predetermined unmodulated phase lagging the phase of said reference voltage by ($n90-\theta$) degrees, where $n$ is odd; first automatic means connected to said first oscillator and including a first comparison circuit for developing a first error voltage when the phase of the output voltage from said first oscillator deviates from its predetermined relationship with respect to that of said reference voltage; first output means for selecting a portion of the output power from said first oscillator; a second oscillator adjusted to have an output voltage at the frequency of said reference voltage but having a second predetermined unmodulated phase lagging the phase of said reference voltage by ($n90+\theta$) degrees, where $n$ is odd; second automatic means connected to said second oscillator and including a second comparison circuit for developing a second error voltage when the phase of the output voltage from said second oscillator deviates from its predetermined relationship with respect to that of said reference voltage; second output means for selecting a portion of the output power from said second oscillator; means for superimposing an intelligence signal voltage on said first error voltage in a first phase and on said second error voltage in an opposite phase; and a combining network having a 90° phase shifting characteristic connected to said first and second output means.

3. A circuit for producing a carrier wave amplitude modulated with an intelligence signal, including: a source of reference voltage having a frequency corresponding to that desired for said carrier wave; a first oscillator adjusted to have an output voltage at the frequency of said reference voltage but having a first predetermined unmodulated phase lagging the phase of said reference voltage by ($n90-\theta$) degrees, where $n$ is odd; first automatic means connected to said first oscillator and including a first phase discriminator for developing a first error voltage when the phase of the output voltage from said first oscillator deviates from its predetermined relationship with respect to that of said reference voltage; first output means for selecting a portion of the output power from said first oscillator; a second oscillator adjusted to have an output voltage at the frequency of said reference voltage but having a second predetermined unmodulated phase lagging the phase of said reference voltage by ($n90+\theta$) degrees, where $n$ is odd; second automatic means connected to said second oscillator and including a second phase discriminator for developing a second error voltage when the phase of the output voltage from said second oscillator deviates from its predetermined relationship with respect to that of said reference voltage; second output means for selecting a portion of the output power from said second oscillator; means for superimposing an intelligence signal voltage on said first error voltage in a first phase and on said second error voltage in an opposite phase; and a combining network connected to said first and second output means.

4. A circuit for producing a carrier wave amplitude modulated with an intelligence signal, including: a source of reference voltage having a frequency corresponding to that desired for said carrier wave; a first oscillator adjusted to have an output voltage at the frequency of said reference voltage but having a first predetermined unmodulated phase lagging the phase of said reference voltage by $(n90-\theta)$ degrees, where $n$ is odd; first automatic means connected to said first oscillator and including a first comparison circuit for developing a first error voltage when the phase of the output voltage from said first oscillator deviates from its predetermined relationship with respect to that of said reference voltage and a first reactance modulator controlled by said first error voltage; first output means for selecting a portion of the output power from said first oscillator; a second oscillator adjusted to have an output voltage at the frequency of said reference voltage but having a second predetermined unmodulated phase lagging the phase of said reference voltage by $(n90+\theta)$ degrees, where $n$ is odd; second automatic means connected to said second oscillator and including a second comparison circuit for developing a second error voltage when the phase of the output voltage from said second oscillator deviates from its predetermined relationship with respect to that of said reference voltage and a second reactance modulator controlled by said second error voltage; second output means for selecting a portion of the output power from said second oscillator; means for superimposing an intelligence signal voltage on said first error voltage in a first phase and on said second error voltage in an opposite phase; and a combining network connected to said first and second output means.

5. A circuit for producing a carrier wave amplitude modulated with an intelligence signal, including: a source of reference voltage having a frequency corresponding to that desired for said carrier wave; a first oscillator adjusted to have an output voltage at the frequency of said reference voltage and cophasal therewith; first automatic means connected to said first oscillator and including a first comparison circuit for developing a first error voltage when the phase of the output voltage from said first oscillator deviates from its cophasal relationship with respect to that of said reference voltage; first output means for selecting a portion of the output power from said first oscillator; a second oscillator adjusted to have an output voltage at the frequency of said reference voltage but lagging the phase thereof by 180 degrees; second automatic means connected to said second oscillator and including a second comparison circuit for developing a second error voltage when the phase of the output voltage from said second oscillator deviates from said 180° relationship with respect to that of said reference voltage; second output means for selecting a portion of the output power from said second oscillator; means for superimposing an intelligence signal voltage on said first error voltage in a first phase and on said second error voltage in an opposite phase; and a combining network connected to said first and second output means.

6. A circuit for producing a carrier wave amplitude modulated with an intelligence signal, including: a source of reference voltage having a frequency corresponding to that desired for said carrier wave; a first oscillator adjusted to have an output voltage at the frequency of said reference voltage and cophasal therewith; first automatic means connected to said first oscillator and including a first comparison circuit for developing a first error voltage when the phase of the output voltage from said first oscillator deviates from its cophasal relationship with respect to that of said reference voltage; first output means for selecting a portion of the output power from said first oscillator; a second oscillator adjusted to have an output voltage at the frequency of said reference voltage but lagging the phase thereof by 180 degrees; second automatic means connected to said second oscillator and including a second comparison circuit for developing a second error voltage when the phase of the output voltage from said second oscillator deviates from said 180° relationship with respect to that of said reference voltage; second output means for selecting a portion of the output power from said second oscillator; means for superimposing an intelligence signal voltage on said first error voltage in a first phase and on said second error voltage in an opposite phase; and a combining network having a 90° phase shift characteristic connected to said first and second output means.

7. A circuit for producing a carrier wave amplitude modulated with an intelligence signal, including: a source of reference voltage having a frequency corresponding to that desired for said carrier wave; a first oscillator adjusted to have an output voltage at the frequency of said reference voltage and cophasal therewith; first automatic means connected to said first oscillator and including a first comparison circuit for developing a first error voltage when the phase of the output voltage from said first oscillator deviates from its cophasal relationship with respect to that of said reference voltage; first output means for selecting a portion of the output power from said first oscillator; a second oscillator adjusted to have an output voltage at the frequency of said reference voltage but lagging the phase thereof by 180 degrees; second automatic means connected to said second oscillator and including a second comparison circuit for developing a second error voltage when the phase of the output voltage from said second oscillator deviates from said 180° relationship with respect to that of said reference voltage; second output means for selecting a portion of the output power from said second oscillator; means for superimposing an intelligence signal voltage on said first error voltage in a first phase and on said second error voltage in an opposite phase; a combining network having input and output terminals and exhibiting a 90° phase shifting characteristic at said carrier wave frequency, said first and second output means being connected to said input terminals, and a load circuit connected to said output terminals.

References Cited in the file of this patent

UNITED STATES PATENTS

| | | |
|---|---|---|
| 2,396,688 | Crosby | Mar. 19, 1946 |
| 2,614,246 | Dome | Oct. 14, 1952 |